(12) United States Patent
Jongmans et al.

(10) Patent No.: US 10,314,231 B2
(45) Date of Patent: Jun. 11, 2019

(54) COMBINE WITH SEED DISPENSING DEVICE

(71) Applicant: CNH Industrial America LLC, New Holland, PA (US)

(72) Inventors: Dré W. J. Jongmans, AG Klundert (NL); Bart M. A. Missotten, Herent (BE); Frederik Tallir, Esen (BE); Willem Vandamme, Ichtegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/422,162

(22) Filed: Feb. 1, 2017

(65) Prior Publication Data

US 2017/0215339 A1    Aug. 3, 2017

(30) Foreign Application Priority Data

Feb. 1, 2016  (BE) .................................. 2016/5079

(51) Int. Cl.
| | |
|---|---|
| A01D 41/12 | (2006.01) |
| A01F 12/40 | (2006.01) |
| A01C 7/10 | (2006.01) |
| A01C 7/20 | (2006.01) |
| A01C 7/00 | (2006.01) |
| A01C 17/00 | (2006.01) |
| A01D 43/14 | (2006.01) |

(52) U.S. Cl.
CPC ............ *A01D 41/1243* (2013.01); *A01C 7/00* (2013.01); *A01C 7/102* (2013.01); *A01C 7/206* (2013.01); *A01C 17/001* (2013.01); *A01D 43/14* (2013.01); *A01F 12/40* (2013.01)

(58) Field of Classification Search
CPC .... A01D 41/1243; A01D 43/12; A01D 43/14; A01F 12/40
See application file for complete search history.

(56) References Cited

U.S. PATENT DOCUMENTS

| | | | | |
|---|---|---|---|---|
| 3,580,257 | A * | 5/1971 | Teague | ............... A01D 41/1208 |
| | | | | 460/1 |
| 3,860,010 | A | 1/1975 | Anderson et al. | |
| 2005/0101363 | A1* | 5/2005 | Farley | ................ A01D 41/1243 |
| | | | | 460/112 |
| 2013/0192503 | A1* | 8/2013 | Henry | .................... A01C 7/082 |
| | | | | 111/174 |

FOREIGN PATENT DOCUMENTS

| | | | | |
|---|---|---|---|---|
| CN | 103782715 A | 5/2014 | | |
| DE | 1035954 B | 8/1958 | | |
| DE | 3626612 A1 | 2/1988 | | |
| DE | 3644767 A1 | 7/1988 | | |
| DE | 4133551 A1 | 4/1993 | | |
| EP | 0640276 A1 * | 3/1995 | ............. | A01B 49/06 |
| JP | S59147428 U | 10/1984 | | |
| KR | 970001089 B1 | 1/1997 | | |
| WO | WO-9515077 A1 * | 6/1995 | ......... | A01D 41/1243 |

* cited by examiner

*Primary Examiner* — Alicia Torres
(74) *Attorney, Agent, or Firm* — Peter K. Zacharias; Patrick M. Sheldrake

(57) ABSTRACT

An agricultural combine including a residue spreading system adapted for spreading residue onto a field. The residue spreading system includes a seed container and a seed dispensing system adapted to dispense seeds from the seed container into the residue so that, in operation, the dispensed seeds are spread onto the field together with the residue.

9 Claims, 1 Drawing Sheet

COMBINE WITH SEED DISPENSING DEVICE

CROSS REFERENCE TO RELATED APPLICATION

This application claims priority to Belgium Patent Application No. 2016/5079 filed Feb. 1, 2016, the contents of which are incorporated herein by reference.

FIELD OF THE INVENTION

The present invention relates to an agricultural combine comprising a seed dispensing device.

BACKGROUND OF THE INVENTION

In order to prevent erosion, to maintain or improve the organic characteristics, structure and/or nutrition level on a field, farmers plant cover crops or green manure crops after their main harvest. In some regions, for example in the whole of Europe, this is obligated to some degree by law since 2015, and might further depend on country specific rules. Traditionally, it required a tractor and implement to go over the field to plant the cover crops after the combine has finished harvesting the main crop. This creates an added machine cost and operator cost as well as extra traffic over the field thereby increasing compaction of the ground surface.

DE 3626612 discloses a combine wherein a seed dispensing system is mounted at a lower back end of the combine body. The advantage of this disclosure is that a field can be harvested and a cover crop or green manure crop can be planted in one go. The combine is adapted to perform both actions at the same time. This relieves the operator from the requirement to use a tractor and implement to go over the field to be planted after the combine is finished harvesting the main crop. When the combine with the seed dispensing system has passed over the field, the field is harvested, and is provided with new seeds in a single operation.

A drawback of the known system is that the seed dispensing system requires a significant amount of mounting space and requires a significantly large opening at the combine body so that seeds can be dispensed and divided onto the field.

It is an object of the present invention to provide a more efficient seed dispensing system.

SUMMARY OF THE INVENTION

To this end, the agricultural combine of the invention comprises a residue spreading system adapted for spreading residue onto a field, wherein the residue spreading system comprises a seed container and a seed dispensing system adapted to dispense seeds from the seed container into the residue, so that, in operation, the dispensed seeds are spread onto the field together with the residue.

The invention is based on the insight that the residue spreading system can be used to spread the seeds onto the field so that the seed spreading system can be omitted while an optimal dividing of seeds onto the field in maintained. Furthermore, a seed dispensing system to dispense seeds in a flow of residue is significantly smaller and simpler than a seed spreading system adapted for spreading the seeds onto the field over a predetermined width, as is suggested in the prior art. Therefore the seed dispensing system of the invention is significantly more compact. Furthermore, the seed dispensing system of the invention should not be mounted adjacent to an opening of the body of the combine since the seeds are not directly spread onto the field via the opening, but are injected into the flow of residue. This gives significant design freedom, and will result, together with the compactness of the seed dispensing system, in a significantly more efficient solution.

Preferably, the residue spreading systems comprises a chaff spreader and a straw spreader, and where the dispensing system is connected to the chaff spreader so that, in operation, the dispensed seeds are spread onto the field together with the chaff. In the body of the agricultural combine, the harvested crop material is processed by separating residue from crop. In most existing combines, this separation is conducted in two phases, in a first phase the straw is removed from the smaller particles comprising crop and chaff which are then processed in a second stage. In the second stage, the chaff is separated from the crop so that a clean crop is obtained. In many existing combines, the chaff is spread over the field separately from the straw. In such combine, it is advantageous to dispense the seeds into the chaff. A first advantage of spreading the seeds together with the chaff is that seed particle size is much closer to chaff particle size than to the large straw particles. The chaff spreading system is optimized for spreading chaff over the field, so that when seeds are dispensed in this system, the seeds will also be optimally dispersed over the field.

Preferably, the straw spreader is located remote from the chaff spreader. Thereby, preferably the chaff spreader is located, in the forward driving direction of the combine, before the straw spreader. Further, preferably, the chaff spreader is located below the straw spreader. When the chaff spreader is located before and/or below the straw spreader, in operation, the chaff particles will be spread onto the field as a first layer on top of which a second layer of straw is spread by the straw spreader. Therefore, the chaff will be spread directly onto the soil and the straw will be dispersed on top of the soil and chaff. By spreading the seeds together with the chaff, the seeds will also arrive directly onto the soil and be covered with a layer of straw. This significantly improves the growing conditions for the seeds since the seeds have direct access to the soil and since the seeds are covered in a straw layer which positively influences the growing conditions. For example through better moisture content and temperature of the soil and protection from direct exposure to the environment.

Preferably, the residue spreading system cooperates with a chopper for chopping residue before spreading, wherein the seed dispensing system is located to dispense the seeds, in operation, in a stream of residue behind the chopper. The chopper is added to the agricultural vehicle to control the particles size of the straw. By adding the seeds after the straw has been chopped, the chopper cannot impact or damage the seeds. This is particularly relevant for embodiments where the seeds are dispensed in a main residue stream, and is less relevant for situations where the seeds are dispensed in the chaff spreading system, since chaff spreading systems usually do not have a chopper.

Preferably, the residue spreading system comprises at least two discs for spreading residue where the seed dispensing system comprising at least two seed dispensing tubes exiting above respective disc of the at least two discs. The tubes allow the seeds to be transported from the seed container to the stream of residue. Furthermore, the tubes can be provided with a seed dispensing mechanism and/or seed metering mechanism so that the seeds can be dosed into the stream. Thereby, the tubes allow to further optimize the location and set-up of the seed dispensing system in the agricultural combine.

Preferably, the dispensing system comprises an input operationally connected to the combine for receiving an input representative for the speed of the combine, and is adapted to dispense the seeds from the seed container with a flow which is related to the input. The speed of the combine is directly related to the amount of the square meters of field that are to be sown with the seeds. Providing an input representative for the speed of the combine, for example a digital or analogue speed signal, the dosage of the seeds onto the field can be automatically kept substantially constant by the seed dispensing system independent of the harvesting speed of the combine. This allows the operator to focus on the harvesting operation while the sowing of seeds at the back of the combine regulates itself proportional to the speed of the combine to obtain a predetermined substantially constant dosage.

The invention further relates to a method for operating an agricultural combine, the method comprising:
cutting crop material from a field using a header of the combine;
processing the crop material in the body of the combine, thereby separating crop from residue;
expelling the residue at a back end of the combine at a residue spreading system;
wherein the method further comprises:
dispensing seeds in a stream of residue such that the seeds are expelled onto the field together with the residue.

This method describes the operation of the above described agricultural combine. The effects and advantages described in relation to the above described agricultural combine equally apply to the method of the invention.

The method preferably further comprises the processing to separate crop from straw material and separate crop from chaff material, the straw and chaff forming the residue, and wherein the seeds are dispensed in the chaff such that the seeds are expelled onto the field together with the chaff. Further, the chaff is spread onto the field before the straw is spread onto the field such that the chaff and seeds are dispersed over the field and subsequently covered by the straw. Using this specific method of operation, there is no need for an operator to use a tractor and implement to go over the field to be planted when the combine has finished harvesting the crop material. This decreases machine cost and operator cost as well as extra traffic over the field which would increase compaction. Furthermore, this method of operation will spread the seeds below the chopped straw from the combine harvester. As a result, the seeds have direct access to the soil, which is significantly more optimal than when the seeds would be spread on top of the chopped straw. As a further result, there is no need for an operation to get the seeds in between or below the straw. A further advantage of the agricultural combine of the invention and the method of the invention is that the header of the combine can be changed without affecting the seed distribution system. This would not be the case when the seed distribution system was mounted onto the header.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
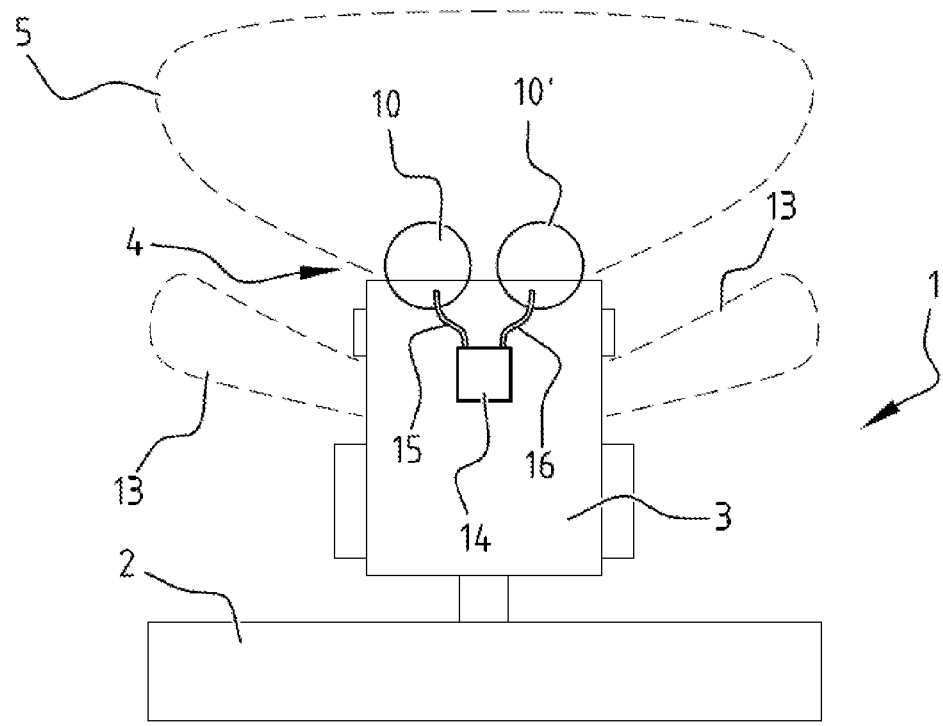
FIG. 1 illustrates a top view of an agricultural combine with a chaff spreader and a straw spreader.

FIG. 1 shows a schematic top view of an agricultural combine 1. The combine 1 comprises a header 2, which is connected to the front end of a combine body 3. The back end of the combine body 3 comprises a residue spreading system 4. Thereby, when the combine 1 is harvesting a field, the header 2 cuts the crop material from the field, and draws the crop material into the body 3 of the combine 1. In the body 3, the crop material is processed to separate the harvest from the residue. The residue is then transported, inside the body 3 of the combine 1, to the residue spreading system 4, which throws the residue onto the field. Thereby, the residue spreading system 4 is conventionally configured to approach a situation wherein the residue is evenly distributed on the field over a width that is equal to the width of the header 2.

The distribution of the residue on the field is adaptable by steering the residue spreading system 4. Indeed, residue spreading systems 4 according to the prior art can be steered to influence the residue distribution, for example to compensate for external influences such as wind so that an even distribution can be obtained in multiple circumstances. Particularly, the force/speed with which the residue spreading system 4 throws the residue out of the back end of the agricultural combine 1 can be adjusted. Furthermore, the angular range over which the residue spreading system 4 spreads the residue can also be adjusted. Thereby, the residue spreading system 4 typically comprises multiple (at least a left and a right) of such adjustable mechanisms 10, 10' for throwing the residue out of the back end of the combine 1. This allows to change the distribution of residue over the field by adapting the residue spreading system 4. Since such mechanisms 10, 10' are known in the prior art, no further specifications are given regarding such residue spreading system since the skilled person knows these systems and will know how such systems can be steered to adapt the residue distribution.

In FIG. 1 the agricultural combine is illustrated in operation, wherein residue is expelled from the combine. The expelled residue has two parts, referred to with reference numbers 5 and 13 respectively. The cloud 5 illustrates the straw that is expelled by the residue spreading system and the cloud 13 illustrates the chaff that is expelled by the residue spreading system. Chaff and straw are separated from the harvest in the body 3 of the agricultural combine 1 using different techniques. As a consequence, some residue spreading systems comprise separate spreading systems for chaff and straw, explaining the chaff cloud 13 located at a distance from the straw cloud 5. Other residue spreading systems combine the straw and the chaff inside the body 3 before expelling it via the residue spreading system so that only one cloud—typically cloud 5—is created when expelling the residue.

In operation, when clouds of chaff 13 and straw 5 are expelled by the agricultural combine 1, either separately or together, the expelled residue forms a cover or layer onto the field behind the agricultural combine 1. It will be clear for the skilled person that in operation, the agricultural combine 1 drives in a forward driving direction, cutting the crop material with the header 2, and expelling the residue at the back of the agricultural combine 1 onto the field over a width that substantially corresponds to the width of the header 2.

When the residue spreading system 4 comprises a chaff spreader and a straw spreader, separate from each other, then two layers will be formed on the soil behind the agricultural combine 1. Directly onto the soil, a first layer of chaff is formed by the chaff spreader spreading the chaff according to the cloud 13. On top of the soil and first layer of chaff, a second layer is formed by straw expelled by the straw spreader, spreading the straw onto the field according to cloud 5. This second layer of straw covers the first layer of chaff and the soil. Chaff spreader and straw spreader settings can be adjusted to create optimal layers, for example evenly distributed layers of chaff and straw.

According to an embodiment of the invention, the residue spreading system further comprises a seed container 14 and a seed dispensing system adapted to dispense seeds from the seed container 14, when the agricultural combine 1 is in operation, into a stream of residue. In FIG. 1, this seed dispensing system is formed by two seed dispensing tubes 15, 16 extending between the seed container 14 and the residue spreading discs 10, 10'. The seed dispensing system allows to mix seeds from the seed container 14 with the residue that is expelled onto the field to distribute the seeds in the layers covering the soil.

Different techniques can be designed to control the seed dispensing system. For example, a seed dosing mechanism is provided between the seed container 14 and the tube outlets so that the amount of seeds that exit the seed dispensing tubes is controllable. Thereby, the seed dosing mechanism is preferably operationally coupled to the agricultural combine so that the dosing of the seeds can be controlled directly proportional to the forward driving speed of the agricultural combine. In this manner, the density of seeds on the field can be kept substantially constant in a cost efficient manner. Also, by proportionally controlling the seed dosing mechanism to the speed of the agricultural combine, the operator of the combine does not need to adjust the seed dosing speed manually to keep the density constant.

In an embodiment of the present invention, the seed dispensing tubes 15, 16 end directly above the residue spreading discs 10, 10'. Each of the tubes 15, 16 end above a respective disc 10, 10' so that seeds are expelled by the discs over the complete width of the field. In embodiments where the residue spreading system comprises more than two discs, then more than two tubes are provided to dispense seeds to each of discs. In other embodiments, the residue spreading system does not comprise discs actively spreading the residue onto the field, but comprises fins for guiding the residue onto the field after the residue has been chopped by a chopper cooperating with the residue spreading system. In such configuration, the chopper, as a side effect to the chopping, also blow the residue out of the back end of the combine 1. Fins are provided to guide the residue into an optimal distribution. In such configuration the seeds dispensing system is preferably provided to dispense seeds in the stream of residue directly behind the chopper. Different seed dosing mechanisms can be designed to distribute seeds in such stream of residue.

Figure 2:
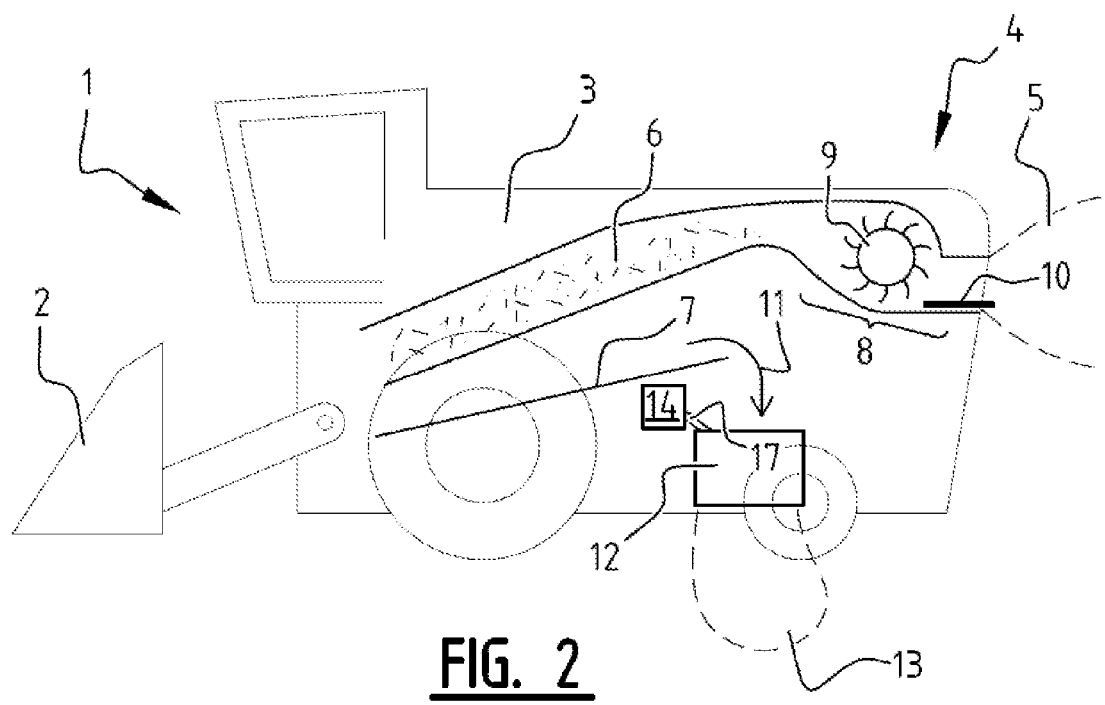
FIG. 2 shows a side cross-sectional view of an agricultural combine with a residue spreading system.

While FIG. 1 illustrates an embodiment where the seeds are dispensed in the straw spreader or, if no chaff spreader is present, in the main residue spreading system, FIG. 2 illustrates an embodiment where the seed dispensing system is adapted to dispense the seeds in the chaff spreader. FIG. 2 illustrates the principles of processing crop material inside a body 3 of an agricultural combine 1. Reference number 6 illustrates the threshing process of the crop material that is cut from the field via the header 2. During threshing 6, the smaller parts such as the harvest particles and the chaff particles are separated from larger crop material elements such as straw. These larger elements are chopped by a chopper 9 and subsequently expelled at the back end of the agricultural combine 1. As described above, the straw can be expelled via residue spreading discs 10 or via fins.

In the body 3 of the agricultural combine 1, the smaller particles are further processed, as is illustrated with reference number 7, to separate the harvest particles from the chaff particles. These chaff particles are collected as is illustrated with arrow 11, in a chaff spreader 12. The chaff spreader 12 distributes the chaff onto the field separately from the straw spreader 8.

In the embodiment of FIG. 2, the seed container 14 is provided with a seed dispensing system 17 for dispensing the seeds in the chaff spreader. An advantage of spreading seeds in the chaff spreader compared to spreading seeds in the straw spreader or in a main residue stream, as is illustrated in FIG. 1, is related to the final position of the seeds onto the field. When the seeds are distributed onto the field together with the chaff, the seeds will be located in a layer of small particles that is situated directly onto the soil, which layer is then covered by a further second layer of straw, as is explained above. This significantly improves the germinating and growing of the seeds due to more optimal temperature and moisture conditions and due to the close proximity of the soil. A skilled person will understand that when seeds are distributed in the layer of straw, or worse, when seeds are distributed onto the field after the agricultural combine has passed, the seeds will be further away from the soil, will be less covered from direct sunlight and other weather influences, so that the germinating and growing of seeds in such situations is less optimal. Another advantage of distributing the seeds together with the chaff is that the particle size of chaff and seeds show a higher resemblance than for example seeds and chopped straw particles. Therefore, a chaff spreader is by nature more optimized for distributing seeds than a straw spreader.

In the embodiment of FIG. 2, a seed dosing mechanism can be added similar to the seed dosing mechanism that is described above in relation to FIG. 1. This allows the seeds to be evenly distributed over the field in the chaff layer of the residue.

From FIG. 2 it is clear that the chaff spreading system 12 is located in the body 3 of the agricultural combine 1 remote from the straw spreader 8. This allows the agricultural combine 1 in operation to first distribute a layer of chaff onto the field and subsequently distribute a layer of straw on top of the layer of chaff on the field.

With the seed dispenser added to the agricultural combine 1, a harvesting operation and a sowing or planting operation can be executed in one movement, thereby significantly decreasing fuel consumption, operator and machine costs and field traffic causing compaction on the field. The seed dispensing system is particularly optimized for planting cover crops, such as grass that don't require intensive tillage operations, but only require a substantially even distribution and access to soil and water to grow. Furthermore, these cover crops are typically planted with low density so that a relatively small seed container is sufficient to plant a significantly large surface area. The cover crop is known to prevent erosion and to improve the organic structure and nutrition level of the field.

Operationally combining the seed distribution and the residue distribution facilitates integrating the seed dispensing function in the agricultural combine 1. This allows to build seed dispensing systems in existing agricultural combines 1 without significant modifications to the existing combine 1. Furthermore, the space that is required to integrate the seed container and seed dispensing system in the agricultural combine is minimal. Also, the location of the seed dispensing system and seed container in the combine can be freely chosen, at least when the dispensed seeds are transported for example via tubes as shown in FIG. 1. This improves the design freedom of the agricultural combine and allows optimization. The seed container and seed dispensing system can be further used for manuring the field whether or not together with seed dispensing.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

What is claimed is:

1. An agricultural combine comprising:
   a residue spreading mechanism adapted for receiving and spreading residue onto a field that has been separated by a threshing system;
   a seed container; and
   a seed dispensing system adapted to dispense seeds from the seed container into the residue prior to being expelled by the spreading mechanism so that, in operation, the spreading mechanism spreads the dispensed seeds onto the field together with the residue.

2. The agricultural combine according to claim 1, wherein the spreading mechanism comprises a chaff spreader and a straw spreader, and wherein the seed dispensing system is connected to the chaff spreader so that, in operation, the dispensed seeds are dispensed into the residue prior to being spread onto the field together with the chaff by the chaff spreader.

3. The agricultural combine according to claim 2, wherein the straw spreader is located behind the chaff spreader relative to a forward driving direction of the combine.

4. The agricultural combine according to claim 3, wherein the chaff spreader is located before the straw spreader relative to the forward driving direction of the combine.

5. The agricultural combine according to claim 3, wherein the chaff spreader is located below the straw spreader.

6. The agricultural combine according to claim 1, wherein the combine further comprises a chopper cooperating with the residue spreading mechanism, the chopper configured for chopping the residue before spreading, wherein the seed dispensing system is located to dispense the seeds in a stream of residue behind the chopper.

7. An agricultural combine comprising:
   a residue spreading system adapted for spreading residue onto a field, the residue spreading system comprising:
   a seed container; and
   a seed dispensing system adapted to dispense seeds from the seed container into the residue so that, in operation, the dispensed seeds are spread onto the field together with the residue;
   wherein the residue spreading system further comprises at least two discs for spreading the residue, wherein the seed dispensing system comprises at least two seed dispensing tubes exiting above a respective one of the at least two discs.

8. The agricultural combine according to claim 1, wherein the seed dispensing system comprises an input operationally connected to a combine propulsion system for receiving an input value representative for the speed of the combine, and is further adapted to dispense the seeds from the seed container with a flow which is related to the input value.

9. A method for operating an agricultural combine, the method comprising steps of:
   cutting crop material from a field using a header of the combine;
   processing the crop material in the body of the combine thereby separating crop from residue, wherein processing the crop material comprises separating crop from straw material and separating crop from chaff material, the straw material and the chaff material forming the residue, and;
   expelling the residue from the body at a back end of the combine via a residue spreading system; and
   dispensing seeds in the residue before the expelling step such that the seeds are expelled onto the field together with the residue by a spreading mechanism of the residue spreading system, wherein the seeds are dispensed in the chaff such that the seeds are expelled onto the field together with the chaff before the straw material is spread onto the field such that the chaff material and seeds are dispersed over the field and subsequently covered by the straw material.

* * * * *